(12) United States Patent
Steinbrecher et al.

(10) Patent No.: US 9,259,995 B2
(45) Date of Patent: Feb. 16, 2016

(54) ENERGY ABSORBING COMPONENT

(71) Applicant: Toyota Motor Engineering & Manufacturing North America, Inc., Erlanger, KY (US)

(72) Inventors: Robert C. Steinbrecher, Dexter, MI (US); Michael G. Morrison, Dexter, MI (US); Michael Zielinski, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 135 days.

(21) Appl. No.: 14/074,420

(22) Filed: Nov. 7, 2013

(65) Prior Publication Data

US 2015/0123426 A1    May 7, 2015

(51) Int. Cl.
*B60J 5/04* (2006.01)
*B60R 13/02* (2006.01)
*B60R 21/04* (2006.01)

(52) U.S. Cl.
CPC .............. *B60J 5/0461* (2013.01); *B60J 5/0451* (2013.01); *B60R 13/0243* (2013.01); *B60R 21/0428* (2013.01)

(58) Field of Classification Search
CPC ... B60J 5/0461; B60J 5/0451; B60R 13/0243; B60R 21/0428
See application file for complete search history.

(56) References Cited

U.S. PATENT DOCUMENTS

| | | |
|---|---|---|
| 5,419,416 A | 5/1995 | Miyashita et al. |
| 5,549,327 A | 8/1996 | Rüsche et al. |
| 6,036,251 A | 3/2000 | Yagishita et al. |
| 6,543,838 B1 * | 4/2003 | Bertolini et al. ........... 296/146.1 |
| 6,547,280 B1 | 4/2003 | Ashmead |
| 6,604,888 B2 | 8/2003 | Dolan |
| 6,752,450 B2 | 6/2004 | Carroll, III et al. |
| 6,905,136 B2 | 6/2005 | Vidal et al. |
| 7,766,386 B2 | 8/2010 | Spingler |

* cited by examiner

*Primary Examiner* — Glenn Dayoan
*Assistant Examiner* — Melissa A Black
(74) *Attorney, Agent, or Firm* — Dinsmore & Shohl LLP

(57) ABSTRACT

An energy absorber for improving passenger safety in a vehicle during an impact to the vehicle, the energy absorber comprising a hollow body having a base defining a proximal end of the body, the base being configured to affix the body to a portion of the vehicle, the body further including a sidewall extending from the base and terminating in a distal end of the body, the sidewall having an interior surface and an exterior surface, the interior surface including a portion defining an interior step transition, the exterior surface including a portion defining an exterior step transition, the interior and exterior step transitions being provided at locations axially offset from each other along the sidewall.

20 Claims, 4 Drawing Sheets

ENERGY ABSORBING COMPONENT

BACKGROUND

1. Field of the Invention

The present invention generally relates to energy absorbing systems and, in particular, to an energy absorbing component of such systems. Energy absorbing systems, of the kind to which the invention relates, are utilized in various automotive vehicle applications to absorb forces during an impact and to enhance the collision protection of the vehicle's occupants.

2. Description of Related Art

In numerous applications, it is desirable to provide a means by which the shock or impact forces of a collision are absorbed. This is particularly true in automotive vehicles, where the side of the vehicle is often subjected to impact. Side impacts may occur anywhere along the side of the vehicle, but when they occur in the door regions, they may particularly result in the forces of the impact being transferred through the door regions into the passenger compartment or cabin of the vehicle. For this reason, many original equipment manufacturers include energy absorbing components (also known as energy absorbers), of one type or another, between exterior and interior panels, or other structures, of the vehicle doors.

Various types of energy absorbing components are known. Typically, these energy absorbing components operate by being positioned between two elements of the vehicle, such as a sheet metal panel and then interior trim panel of a door, and deforming under stress. The energy absorbing components may take many forms, including foam blocks of suitable density and rigidity. Suitable foam blocks, because of the required density, can significantly add to the weight of the door and, ultimately, the vehicle, particularly when the distance between the two elements is large.

In such instances, hollow elongated bodies have found use as the energy absorbing components. These hollow bodies are generally made of plastic and have a variety of shapes including rectangular, cylindrical or conical. During use, a force applied exteriorly to the door is transferred to one end of the hollow body. The hollow body is designed so that when the body experiences a given stress, it will either elastically or plastically deform, thereby absorbing some of the force being exerted against the door and reducing the amount of force that is transmitted through the door and potentially to an occupant of the vehicle.

When undergoing deformation, the hollow body may be designed to react in a variety of ways. In one known reaction manner, while the hollow body is crushed, it collapses upon itself. Controlling such a collapse is an important consideration in the design of an energy absorbing component of this variety.

SUMMARY

In satisfying the above need, as well as overcoming the enumerated drawbacks and other limitations of the related art, the present invention provides an energy absorber for improving passenger safety in a vehicle during an impact to the vehicle, the energy absorber comprising a hollow body having a base defining a proximal end of the body, the base being configured to affix the body to a portion of the vehicle, the body further including a sidewall extending from the base and terminating in a distal end of the body, the sidewall having an interior surface and an exterior surface, the interior surface including a portion defining an interior step transition, the exterior surface including a portion defining an exterior step transition, the interior and exterior step transitions being provided at locations axially offset from each other along the sidewall.

In another aspect of the invention, the interior and exterior step transitions define thickness changes in the sidewall.

In a further aspect of the invention, proceeding along the sidewall from the distal end toward the base, one of the interior and exterior step transitions decreases the thickness of the sidewall and the other of the interior and exterior step transitions increases the thickness of the sidewall.

In yet another aspect of the invention, proceeding along the sidewall from the distal end towards the base, the interior step transition decreases the thickness of the sidewall and the exterior step transition increases the thickness of the sidewall.

In an additional aspect of the invention, the sidewall exhibits a tapered thickness in a region between the interior step transition and the exterior step transition.

In another aspect of the invention, the sidewall exhibits a tapered thickness, the tapered thickness increasing in thickness proceeding from the distal end towards the base.

In still a further aspect of the invention, the sidewall includes two interior step transitions and one exterior step transition.

In an additional aspect of the invention, the exterior step transition is axially located at a position along the sidewall between the two interior step transitions.

In another aspect of the invention, the sidewall has a first sidewall thickness on one side of the interior step transition and a second sidewall thickness on the other side of the interior step transition, the first sidewall thickness being different from the second sidewall thickness.

In still another aspect of the invention, the sidewall exhibits a minimum sidewall thickness defined at a location adjacent to the one of the interior and exterior step transitions that is located closest to the distal end.

In yet another aspect of the invention, the sidewall has a tapered thickness between successive ones of the interior and exterior step transitions, the tapered thickness increasing in thickness proceeding from the distal end toward the base.

In a further aspect of the invention, the sidewall has a plurality of tapered thickness regions, the tapered thickness regions increasing in thickness proceeding from the distal end toward the base.

In another aspect of the invention, the distal end includes an end wall closing off one end of the body.

In still another aspect of the invention, an energy absorber for improving passenger safety in a vehicle during an impact to the vehicle is provided, the energy absorber comprising a hollow body having a base defining a proximal end of the body, the base being configured to affix the body to a portion of the vehicle, the body further including a sidewall extending from the base and terminating in a distal end of the body; and proceeding along the sidewall from the distal end toward the base, the sidewall transitioning at a first step transition from a first sidewall thickness to a second sidewall thickness, the second sidewall thickness being less than the first sidewall thickness.

In a further aspect of the invention, proceeding along the sidewall from the first step transition toward the base, the sidewall transitioning at a second step transition from a third sidewall thickness to a fourth sidewall thickness, the third sidewall thickness being greater than the second sidewall thickness but less than the fourth sidewall thickness.

In yet another aspect of the invention, between the first and second step transitions, the sidewall exhibits a tapered thickness.

In an additional aspect of the invention, proceeding along the sidewall from the second step transition toward the base, the sidewall transitioning at a third step transition from a fifth sidewall thickness to a sixth sidewall thickness, the sixth sidewall thickness being less than the fifth sidewall thickness.

In another aspect of the invention, between the second and third step transitions, the sidewall exhibits a tapered thickness.

In still a further aspect of the invention, the taper thickness increases in thickness between the third step transition and the base.

In an additional aspect of the invention, the tapered thickness increases in thickness between the third step transition and the base.

Further objects, features and advantages of this invention will become readily apparent to persons skilled in the art after a review of the following description, with reference to the drawings and claims that are appended to and form a part of this specification.

DETAILED DESCRIPTION

Figure 1:
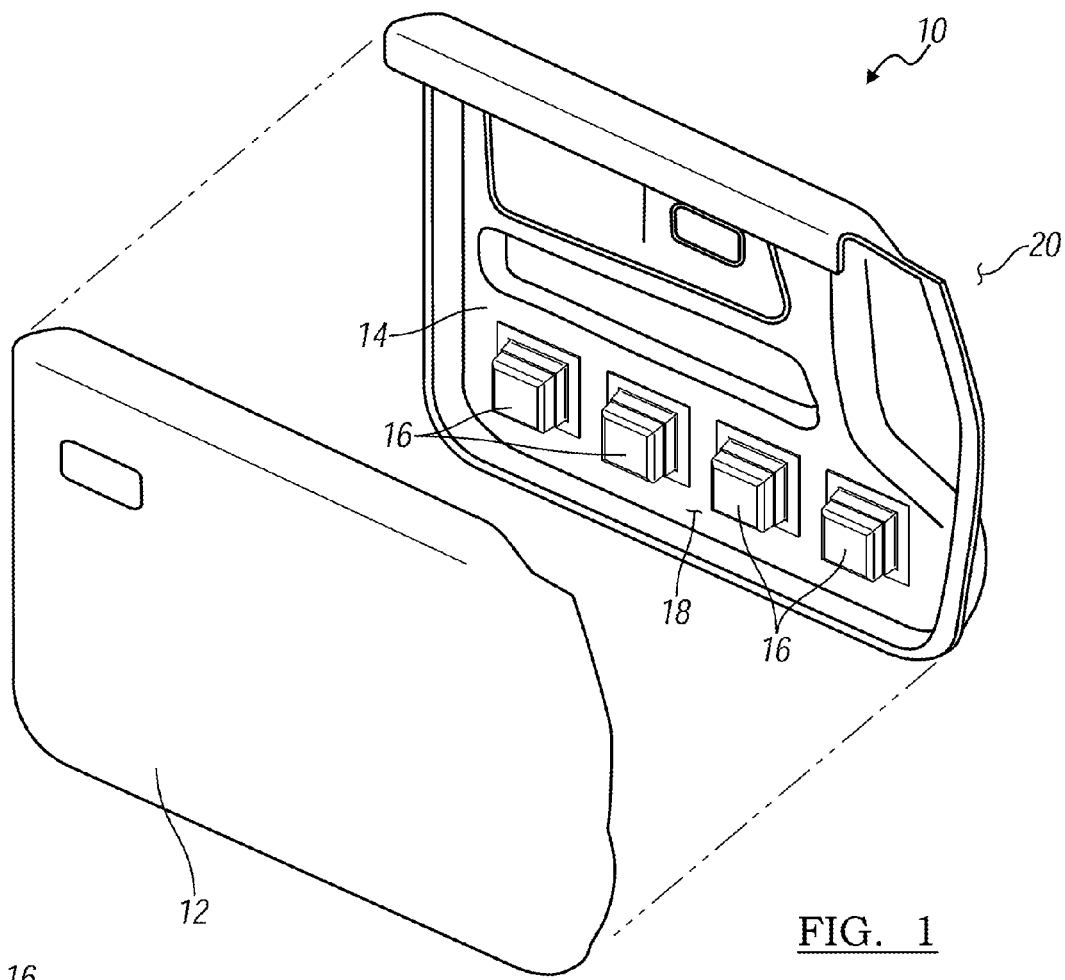
FIG. 1 is an exploded perspective view of an automotive vehicle door having energy absorbing components incorporating the principles of the present invention.

Referring now to the drawings, an energy absorbing system embodying the principles of the present invention is illustrated in FIG. 1 and designated at 10. As depicted in FIG. 1, the energy absorbing system 10 is a component of an automotive vehicle, namely a door. As its primary components, the application of the energy absorbing system 10 in an automotive vehicle door includes an exterior panel 12, an interior panel 14 and one or more energy absorbing components 16 positioned so as to at least partially fill a void 18 or space between the exterior and interior panels 12, 14. In this application, the exterior panel 12 may be the sheet metal panel defining the exterior skin of the door, and the interior panel 14 may be the interior trim panel of the door. As seen in FIG. 1, a plurality of energy absorbing components 16 are mounted to the interior panel 14 and extend in a direction away from the interior panel 14 toward the exterior panel 12.

During a collision in which the door is subjected to an impact force, such as a side-impact to the automotive vehicle, the impact force causes the exterior panel 12 to deform toward the interior panel 14. With the energy absorbing components 16 located within the void 18 between the exterior panel 12 and the interior panel 14, the amount of force that is transmitted through the door and to an occupant located in the passenger compartment of the vehicle is diminished and reduced by the energy absorbing components 16, which crush and/or deform during the collision. The passenger compartment of the vehicle is represented in FIG. 1 as the area generally to the right of the interior panel 14 and is designated at 20.

While the energy absorbing system 10 is illustrated in FIG. 1 as including four energy absorbing components 16, provided as a linear array or straight-line series, it will be appreciated that the number of energy absorbing components 16 and their arrangement within the void 18 will and can depend upon the particular design of the energy absorbing system 10 for the vehicle. For example, the system 10 may include as many energy absorbing components 16 as can be arranged and fitted within the void 18 so that the void is completely or substantially filled. In another example, the system 10 may include just one energy absorbing component 16 that is strategically positioned within the void 18.

Generally, the energy absorbing component 16 is defined by a body 22 that includes a sidewall 24 extending from a proximal end 26 to a distal end 28. The proximal end 26 defines a base 30 that is configured to secure the energy absorbing component 16 to the interior panel 14 of the energy absorbing system 10. The base 30 may be provided in the form of a flange extending radially outward from the sidewall 24.

The distal end 28 of the body 22 is provided with an end wall 34 that extends radially inward so as to close off the distal end of the body 22. It will be appreciated, however, that the end wall 34 may alternatively only extend partially across the distal end 28 or may be omitted altogether. In those embodiments, the body 22 is not closed off at the distal end 28. In each of the above embodiments, it is seen that the body 22 is a hollow body.

Figure 2A:
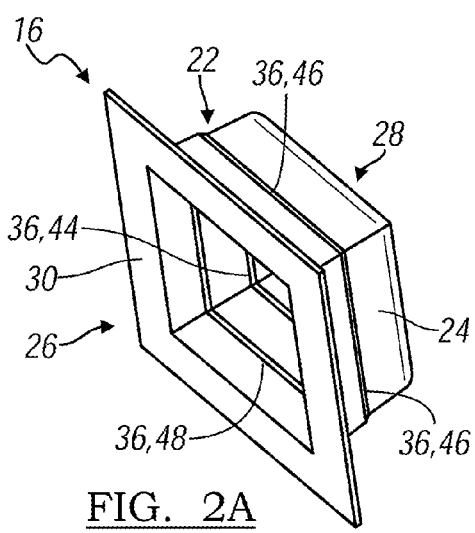
FIG. 2A is a quartering view, taken from the base, of one embodiment of an energy absorbing component incorporating the principles of the present invention.
Figure 2B:
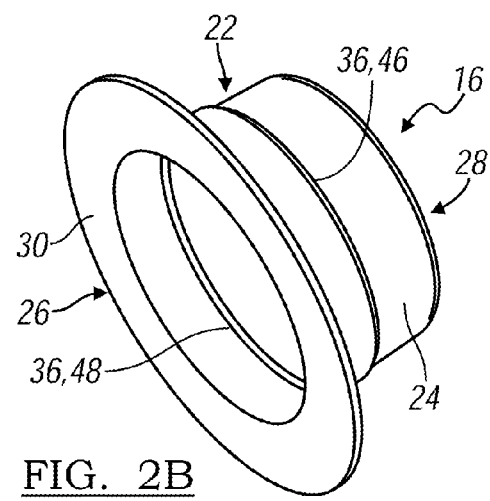
FIG. 2B is a quartering view, also taken from the base, to a second embodiment of an energy absorbing component incorporating the principles of the present invention.

FIGS. 2A and 2B illustrate two alternative configurations for the energy absorbing component 16 and, in particular, the shape of the sidewall 24 of the body 22. As seen in FIG. 2A, the sidewall 24 is generally square or rectangular in cross-section, with rounded corners. This provides the body 22 with what may be characterized as a cube or boxed shape. In FIG. 2B, the cross-section of the sidewall 24 is generally round. This provides the body 22 with a shape characteried as tubular or cylindrical. As will be appreciated, other closed sidewall shapes could be provided as the cross-sectional shape of the sidewall 24.

Figure 3:
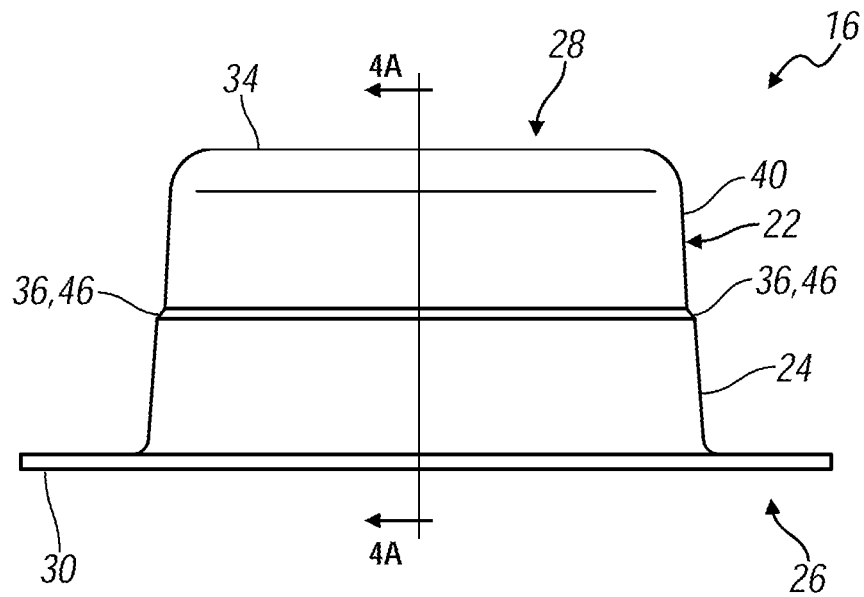
FIG. 3 is a side elevational view of an energy absorbing component incorporating the principles of the present invention.

To absorb the impact force, the construction of the energy absorbing component 16 allows it to crush or collapse in a predetermined or controlled manner during an impact. This controlled collapsing of the energy absorbing components 16 is facilitated by the incorporation of specific features into the sidewall 24 of the body 22. While these features are illustrated in FIGS. 1-2B, they are perhaps best seen with reference to FIGS. 3, 4A and 4B. As will be appreciated from a study of the figures, FIGS. 3, 4A and 4B can and are to be interpreted as elevational and cross-sectional representations of both embodiments shown in FIGS. 2A and 2B.

By collapsing during an impact, some of the energy of the impact is absorbed by the energy absorbing component 16, reducing the energy potentially transferred to an occupant of the vehicle. In the energy absorbing component 16 of the present invention, the collapsing of the body 22 is controlled by specifically configuring the sidewall 24. More specifically, the sidewall 24 is provided with a series of steps 36, each of which defines a failure point enabling the controlled collapsing of the energy absorbing component 16. Additionally, the thickness of the sidewall 24 varies along its axial length, or more specifically, the length progressing from the proximal end 26 to the distal end 28.

Regarding the formation of the steps 36 along the sidewall 24, the sidewall 24 is provided with at least one step 36 and is preferably provided with more than one step 36. In the illustrated embodiment, the sidewall 24 has three steps 36.

Figure 4A:
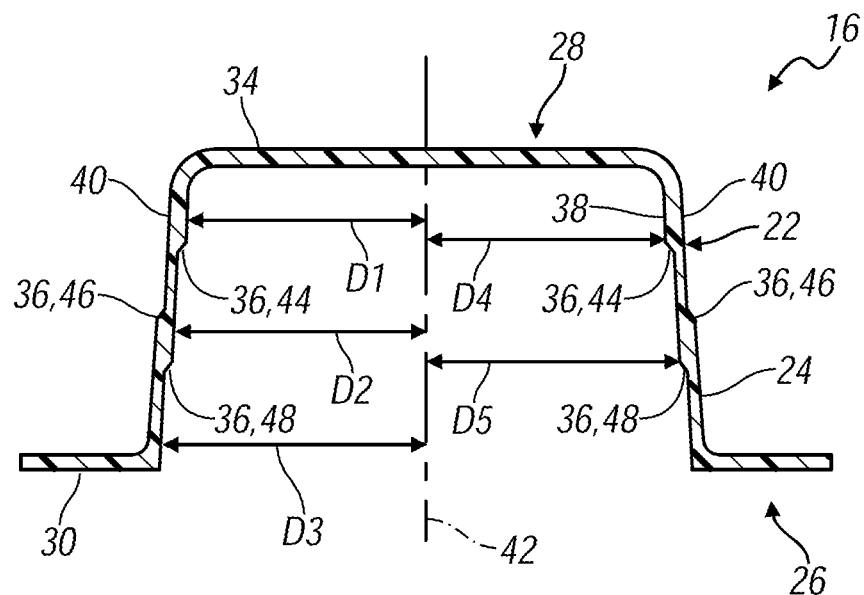
FIGS. 4A and 4B are cross-sectional views, generally taken along line 4-4 of FIG. 3, through an energy absorbing component incorporating the principles of the present invention.

Each step 36 forms a transition or change in height or thickness of the sidewall 24. Alternatively, the steps 36 can be viewed as defining a change in the distance of the sidewall's interior or exterior surfaces 38, 40 from a central axis 42, defined longitudinally through the body 22. In providing the steps 36, the steps 36 are alternatingly formed on the interior and exterior surfaces 38, 40 of the sidewall 24. As seen in FIG. 4A, when proceeding from the distal end 28 toward the proximal end 26, a first step 44 is encountered on the interior surface 38, a second step 46 is encountered on the exterior surface 40, and a third step 48 is thereafter again encountered on the interior surface 38. The steps 36 may be evenly spaced along the sidewall 24 or they may be unevenly spaced.

Figure 4B:
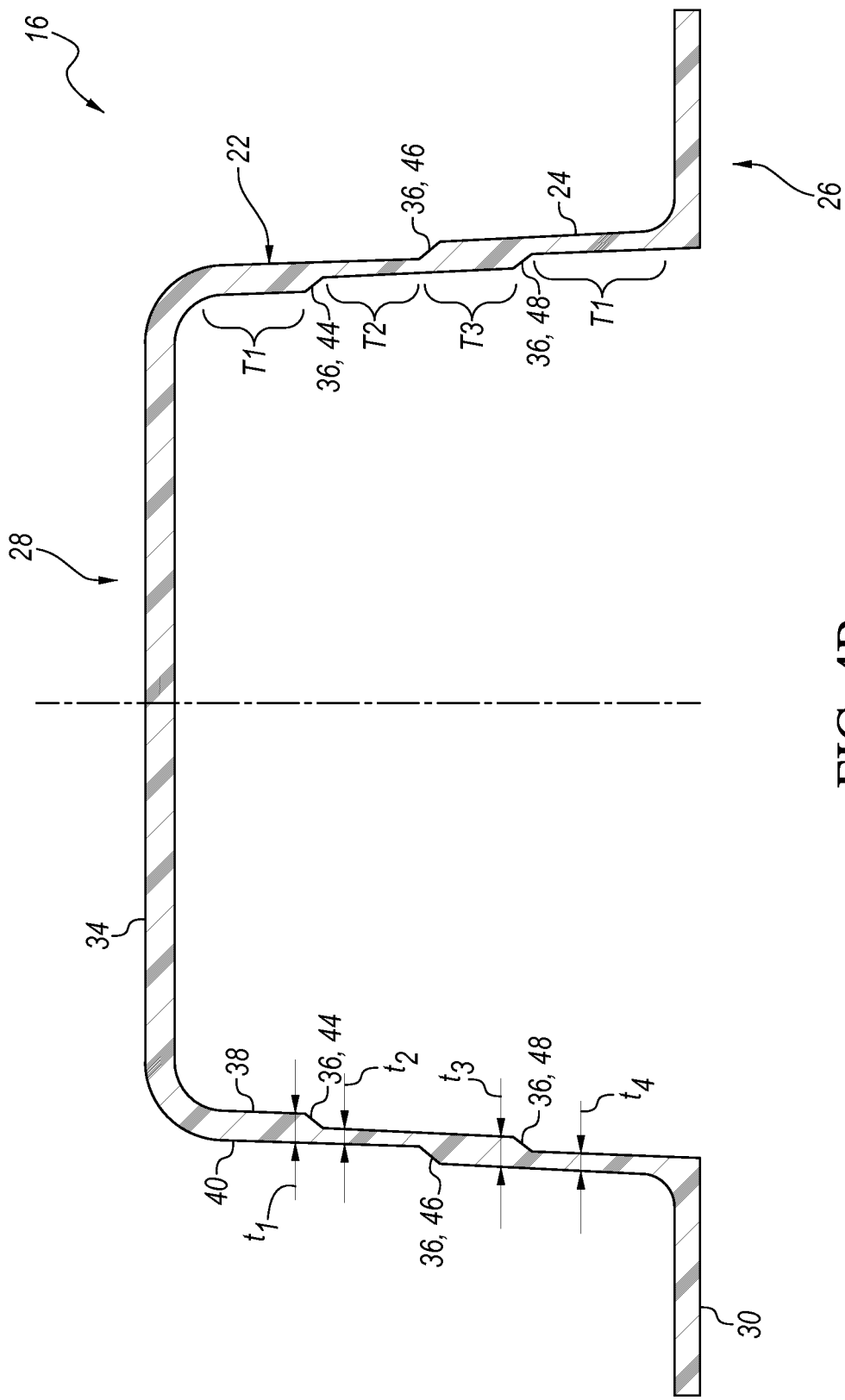

As is evident from FIGS. 4A and 4B, the general thickness of the sidewall 24 changes at each of the steps 36. Again proceeding from the distal end 28 toward the proximal end 26, it is seen that, at the first step 44, the thickness of the sidewall 24 changes from a general thickness T1 to a second general thickness T2, with the first thickness T1 being greater than the second thickness T2. At the second step 46, the thickness of the sidewall changes from the second general thickness T2 to a third general thickness T3, with the second thickness T2 being less than the third thickness T3. At the third step 48, the thickness changes from the third general thickness T3 to a fourth general thickness T4, wherein the third thickness T3 is greater than the fourth thickness T4. Stated another way, as illustrated, the thickness of the sidewall 24 goes from an increased thickness to a decreased thickness, back to an increased thickness, and then again back to a decreased thickness. Alternatively, the thickness changes would be reversed.

Described in terms of the relative distance of the surfaces of the sidewall 24 from the longitudinal axis 42 of the body 22, it is seen that both the interior surface 38 and the exterior surface 40 increase in their distance from the longitudinal axis 42 at each of the steps 36 (when progressing along the sidewall 24 from the distal end 28 to the proximal end 26 of the body 22). Thus, the interior surface 38 defines a first general distance D1 before the first step 44 and a second general distance D2 after the first step 44, as well as a third general distance D3 after the third step 48, with each of these distances being successively greater than the preceeding distance. Regarding the exterior surface 40, a fourth general distance D4 is defined before the second step 46, and a fifth general distance D5 is defined after the second step 46, with the fourth distance D4 being less than the fifth distance D5. It further follows that the fourth distance D4 is greater than the first distance D1 and the second distance D2, and that the fifth distance D5 is greater than the second distance D2 and the third distance D3 since the relative locations of these two exterior surfaces are radially outward of the noted/corresponding interior surfaces.

As will be appreciated from a review of FIG. 4, the above-mentioned thicknesses and distances are general in nature and cover a region or portion of the sidewall 24. These thicknesses and distances are referred to as being general in nature because the interior and exterior surfaces 38, 40 of the sidewall 24 are not parallel to the central axis 42. Rather, the interior and exterior surfaces 38, 40 are slightly angled outwardly from the central axis 42, again proceeding from the distal end 28 to the proximal end 26 of the body 22.

Additionally, the interior and exterior surfaces 38, 40 themselves are not parallel to one another. Instead, these surfaces 38, 40 diverge from one another in the direction of the base 30. In other words, for a given length of the sidewall 24 between any two steps 36, the thickness of the sidewall generally increases when proceeding in the direction toward the base 30. For this reason, the general thickness T2 is specifically seen to be thinner immediately after the first step 44 than immediately before the second step 46.

Figure 5:
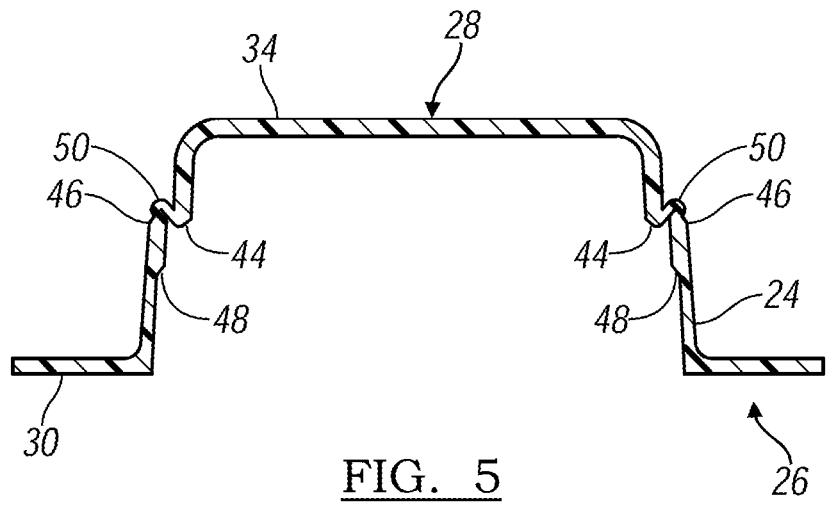
FIGS. 5-7 are cross-sectional views, similar to that seen in FIG. 4, respectively illustrating the energy absorbing component in progressively collapsed states.
Figure 6:
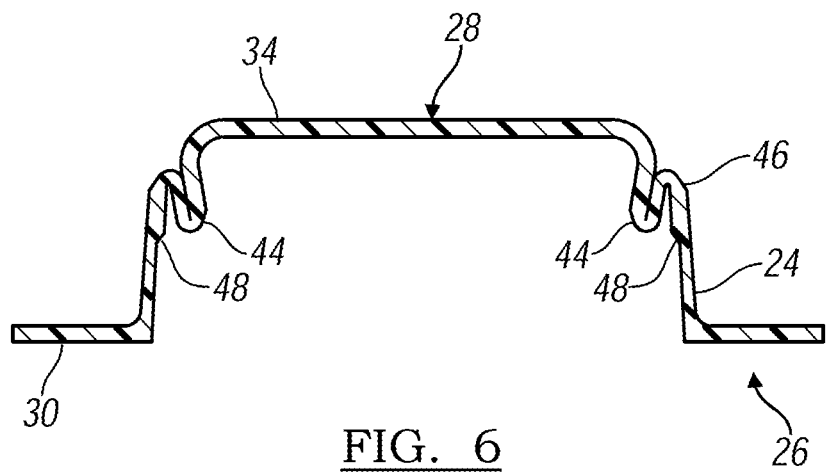
Figure 7:
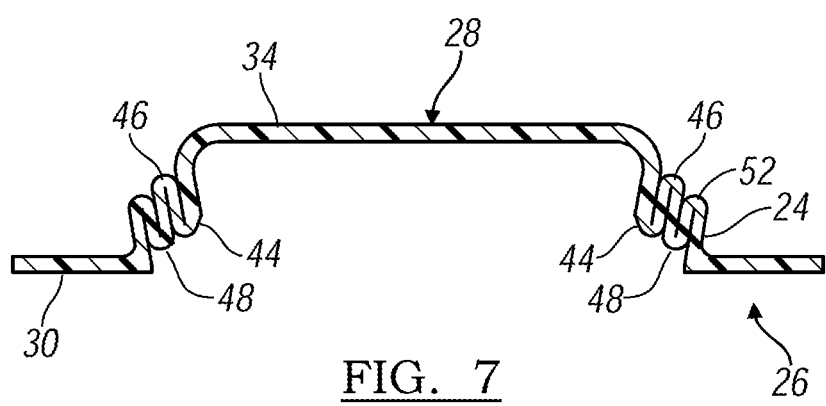

Referring now to FIGS. 5-7, seen therein is a sequential representation of the energy absorbing component 16 during a collision in which the exterior panel 12 is deformed towards the interior panel 14. While the exact movement of the collapsing of the sidewall 24 may vary due to the actual nature of the collision, the following discussion is representative of the controlled collapse experienced by the energy absorbing structure 16.

Seen in FIG. 5 is an initial stage of collapse. During this initial stage of collapse, the energy absorbing structure 16 has suffered a failure at the first step 44. With this failure, the thinnest portion of the sidewall 24 (which has a thickness of $t_2$ immediately after the first step 44) folds back upon itself and the thicker portion $t_1$ of the sidewall 24 before the first step 44, forming a folded portion 50. During this, the thicker portion $t_1$ is driven slightly radially inward and alongside of the folded portion 50.

Further collapse of the energy absorbing component 16 results in the unfolding of the folded portion 50 as the first step 44 is driven axially past the second step 46. In this state, which is seen in FIG. 6, a second failure of the sidewall 24 occurs at the second thinnest portion of the sidewall 24, which is at the thickness $t_2$ immediately before the second step 46. With the second failure, that portion (generally T2) of the sidewall 24 located between the first step 44 and the second step 46, now lies adjacent and radially inward of the thicker portion (generally T3) of the sidewall after the second step 46, in other words, between T1 and T3.

If the energy absorbing component 16 is further collapsed, the collapsing proceeds in a manner similar to that of the initial collapse. During this third state of failure, the third thinnest portion of the sidewall 24, with thickness $t_4$ immediately after the third step 48, fails and folds upon itself, forming another folded portion 52.

As seen from the above description of the collapsing of the energy absorbing component 16, the collapse can generally be described as one in which the sidewall 24 of the component 16 progresses into an accordion or corrugated structure. With the changes in thicknesses of the sidewall 24 at and between each of the steps 36, the deformation and collapse of the energy absorbing component 16 is consistent and exhibits more controlled energy absorption properties. The component 16 first fails at the thinnest location of the sidewall 24 (which is thickness $t_2$ immediately after the first step 44), and then fails at the second thinnest location (which is thickness $t_3$ immediately before the second step 46), and so on as failure continues.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

We claim:

1. An energy absorber for improving passenger safety in a vehicle during an impact to the vehicle, the energy absorber comprising:

a hollow body having a base defining a proximal end of the body, the base being configured to affix the body to a portion of the vehicle, the body further including a sidewall extending from the base and terminating in a distal end of the body, the sidewall having an interior surface and an exterior surface, the interior surface including a portion defining an interior step transition, the exterior surface including a portion defining an exterior step transition, the interior and exterior step transitions being provided at locations axially offset from each other along the sidewall, wherein the interior step transition and the exterior step transition define a change in a thickness of the sidewall evaluated between the interior surface and the exterior surface, wherein proceeding along the sidewall from the distal end toward the base, one of the interior step transition and the exterior step transition decreases the thickness of the sidewall and the other of the interior step transition and the exterior step transition increases the thickness of the sidewall.

2. The energy absorber of claim 1, wherein, proceeding along the sidewall from the distal end towards the base, the interior step transition decreases the thickness of the sidewall and the exterior step transition increases the thickness of the sidewall.

3. The energy absorber of claim 1, wherein a thickness of the sidewall positioned in a region between the interior step transition and the exterior step transition in an axial direction is less than a thickness of the sidewall positioned outside of the region between the interior step transition and the exterior step transition.

4. The energy absorber of claim 1, wherein the sidewall includes two interior step transitions and one exterior step transition.

5. The energy absorber of claim 4, wherein the exterior step transition is axially located at a position along the sidewall between the two interior step transitions.

6. The energy absorber of claim 1, wherein the distal end includes an end wall closing off one end of the body.

7. The energy absorber of claim 1, wherein a thickness of the sidewall positioned in a region between the interior step transition and the exterior step transition in an axial direction is greater than a thickness of the sidewall positioned outside of the region between the interior step transition and the exterior step transition.

8. The energy absorber of claim 1, wherein, proceeding along the sidewall from the distal end towards the base, the exterior step transition decreases the thickness of the sidewall and the interior step transition increases the thickness of the sidewall.

9. The energy absorber of claim 1, wherein proceeding along the sidewall from the distal end toward the base, the exterior step transition increases a distance evaluated between the exterior surface of the sidewall and a longitudinal axis of the hollow body.

10. The energy absorber of claim 1, wherein proceeding along the sidewall from the distal end toward the base, the interior step transition increases a distance evaluated between the interior surface of the sidewall and a longitudinal axis of the hollow body.

11. The energy absorber of claim 1, wherein the sidewall comprises a plurality of interior step transitions.

12. The energy absorber of claim 11, wherein the exterior step transition is positioned between ones of the plurality of interior step transitions in an axial direction.

13. The energy absorber of claim 11, wherein, proceeding along the sidewall from the distal end to the base, each of the plurality of interior step transitions decrease the thickness of the sidewall.

14. An energy absorber for improving passenger safety in a vehicle during an impact to the vehicle, the energy absorber comprising:

a hollow body having a base defining a proximal end of the body, the base being configured to affix the body to a portion of the vehicle, the body further including a sidewall extending from the base and terminating in a distal end of the body; and proceeding along the sidewall from the distal end toward the base, the sidewall transitioning at a first step transition from a first sidewall thickness evaluated between the interior surface and the exterior surface to a second sidewall thickness evaluated between the interior surface and the exterior surface, the second sidewall thickness being less than the first sidewall thickness, and proceeding from the first step transition to the base, the sidewall transitioning at a second step transition from the second sidewall thickness to a third sidewall thickness evaluated between the interior surface and the exterior surface, the third sidewall thickness being greater than the second sidewall thickness.

15. The energy absorber of claim 14, wherein, proceeding along the sidewall from the second step transition toward the base, the sidewall transitioning at a third step transition from the third sidewall thickness to a fourth sidewall thickness, the third sidewall thickness being greater than the fourth sidewall thickness.

16. The energy absorber of claim 14, wherein at least one of the first step transition and the second step transition is positioned on the interior surface of the sidewall.

17. The energy absorber of claim 16, wherein the second step transition is positioned on the exterior surface of the sidewall.

18. The energy absorber of claim 14, wherein at least one of the first step transition and the second step transition is positioned on the exterior surface of the sidewall.

19. The energy absorber of claim 14, wherein, proceeding along the sidewall from the distal end toward the base, the first step transition increases a distance evaluated between the interior surface of the sidewall and a longitudinal axis of the hollow body.

20. The energy absorber of claim 14, wherein, proceeding along the sidewall from the first step transition to the base, the second step transition increases a distance evaluated between the exterior surface of the sidewall and a longitudinal axis of the hollow body.

* * * * *

UNITED STATES PATENT AND TRADEMARK OFFICE
CERTIFICATE OF CORRECTION

PATENT NO.       : 9,259,995 B2                       Page 1 of 1
APPLICATION NO.  : 14/074420
DATED            : February 16, 2016
INVENTOR(S)      : Robert C. Steinbrecher et al.

It is certified that error appears in the above-identified patent and that said Letters Patent is hereby corrected as shown below:

In The Specification

In Column 4, Line 44, after "a shape", delete "characteried" and insert --characterized-- therefor.

Signed and Sealed this
Third Day of May, 2016

Michelle K. Lee
*Director of the United States Patent and Trademark Office*